(12) United States Patent
Grebel et al.

(10) Patent No.: US 11,851,112 B2
(45) Date of Patent: Dec. 26, 2023

(54) POSITION-VARIABLE VEHICLE AERODYNAMICS MODULE WITH DEFORMABLE CONNECTING STRUCTURE

(71) Applicant: Röchling Automotive SE, Mannheim (DE)

(72) Inventors: Karsten Grebel, Bürstadt (DE); Patrick Urbach, Mainz (DE)

(73) Assignee: Röchling Automotive SE, Mannheim (DE)

( * ) Notice: Subject to any disclaimer, the term of this patent is extended or adjusted under 35 U.S.C. 154(b) by 235 days.

(21) Appl. No.: 17/508,136

(22) Filed: Oct. 22, 2021

(65) Prior Publication Data

US 2022/0126930 A1   Apr. 28, 2022

(30) Foreign Application Priority Data

Oct. 27, 2020   (DE) ...................... 10 2020 128 214.1

(51) Int. Cl.
*B62D 35/00*   (2006.01)
(52) U.S. Cl.
CPC .................................. *B62D 35/00* (2013.01)
(58) Field of Classification Search
CPC ...... B62D 35/00; B62D 35/005; B62D 21/15; B62D 37/02; Y02T 10/82
See application file for complete search history.

(56) References Cited

U.S. PATENT DOCUMENTS

| | | | |
|---|---|---|---|
| 10,953,933 B2 | 3/2021 | Schmitt et al. | |
| 11,077,892 B2 | 8/2021 | Grebel et al. | |
| 2017/0355403 A1* | 12/2017 | Grebel ................. | B62D 35/005 |

FOREIGN PATENT DOCUMENTS

| | | | | |
|---|---|---|---|---|
| CN | 107848582 A | * | 3/2018 | ............. B62D 35/00 |
| GB | 2131368 A | * | 6/1984 | ........... B62D 35/005 |
| WO | WO-2015191711 A2 | * | 12/2015 | ........... B62D 35/005 |

OTHER PUBLICATIONS

German Search Report for corresponding DE 10 2020 128 214.1 dated Jun. 14, 2021, 9 pgs.

* cited by examiner

*Primary Examiner* — Lori Lyjak
(74) *Attorney, Agent, or Firm* — Rankin, Hill & Clark LLP

(57) ABSTRACT

A position-variable motorized vehicle aerodynamics module, having:
 A flow component which is configured to be subjected to an incident flow or surrounding flow of an airstream,
 A bracket, which is configured for fixed attachment to a structure fixed to a vehicle,
 A power unit, which is configured to displace the flow component between at least two different operating positions relative to the bracket under normal operating conditions,
 A connecting structure, which the flow component connects with the power unit in a force- and movement-transmitting manner, and
 A guiding arrangement, which guides the displacement movement of the flow component between the at least two operating positions,
Where the connecting structure is configured, in the event of a force being transmitted to the flow component through collision with a solid body, to allow through deformation an evasive movement of the flow component relative to the bracket; where the connecting structure is part of the guiding arrangement, and where the evasive movement differs from the displacement under normal operating conditions.

18 Claims, 3 Drawing Sheets

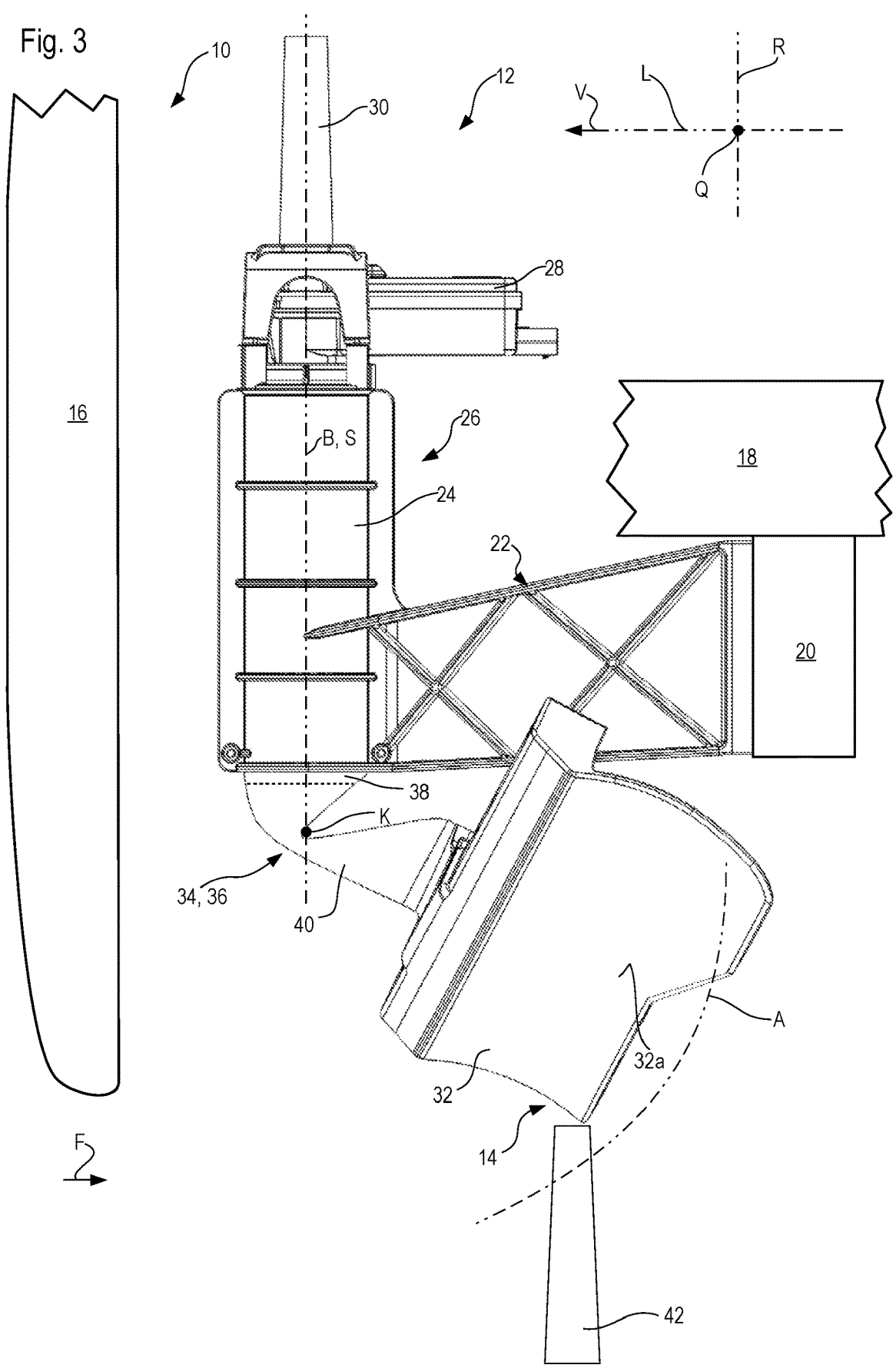

POSITION-VARIABLE VEHICLE AERODYNAMICS MODULE WITH DEFORMABLE CONNECTING STRUCTURE

This application claims priority in German Patent Application DE 10 2020 128 214.1 filed on Oct. 27, 2020, which is incorporated by reference herein.

The present invention concerns a position-variable motorized vehicle aerodynamics module, comprising:
- A flow component which is configured to be subjected to an incident flow or surrounding flow of an airstream,
- A bracket, which is configured for fixed attachment to a structure fixed to a vehicle,
- A power unit, which is configured to displace the flow component between at least two different operating positions relative to the bracket under normal operating conditions,
- A connecting structure, which connects the flow component with the power unit in a force- and movement-transmitting manner, and
- A guiding arrangement, which guides the displacement movement of the flow component between the at least two operating positions, Where the connecting structure is configured, in the event of a force being transmitted to the flow component through collision with a solid body, to allow through deformation an evasive movement of the flow component relative to the bracket.

BACKGROUND OF THE INVENTION

Such an aerodynamics module of a motorized vehicle is known from DE 10 2018 123 487 A1. The connecting structure of the aerodynamics module described there in an embodiment example of a wheel spoiler, connects a crank at the output shaft of an electric motor with the wheel spoiler. A four-bar linkage forms in the embodiment example known from DE 10 2018 123 487 A1, a guiding arrangement which guides the movement of the wheel spoiler between a retracted and an extended operating position.

In active position-variable aerodynamics modules, such flow components are only moved at higher travel speeds of the vehicle carrying the aerodynamics module in the airstream flowing around the vehicle, since normally aerodynamic effects become usable at a significant order of magnitude only at higher travel speeds and thus at higher flow speeds.

DE 10 2018 123 487 A1 proposes to implement the connecting structure deformably, such that in the event of a collision the extended flow component, under deformation of the connecting structure, moves from the extended operating position back in the direction towards the retracted position while being guided by the guiding arrangement, in order to prevent damage to the flow component resulting from the forces acting during the collision or in order to be able to limit the adverse effects of the collision.

It is a drawback of the solution known from DE 10 2018 123 487 A1 that it functions variably well for different movement trajectories between the retracted and the extended operating position. Normally the aerodynamics module is arranged in the lower region of a motorized vehicle, where in the retracted position the flow component is arranged nearer to the vehicle's body, for instance at the vehicle's underbody, and in the extended position it is arranged further away from the vehicle's underbody and/or nearer to a road surface travelled on by the vehicle, respectively. Therefore, collision-induced forces act as reaction forces on the flow component normally opposite to the direction of travel, i.e. parallel to the roll axis of the vehicle. The larger the angle of the movement trajectory of the displacement defined by the guiding arrangement under normal operating conditions with the roll axis of the vehicle carrying the aerodynamics module, the smaller the force component acting in the event of a collision in a restoring manner on the flow component and the larger the force component acting in a stressing to destructive manner on the flow component.

SUMMARY OF THE INVENTION

It is, therefore, the task of the present invention to further develop the motorized vehicle aerodynamics module referred to in the beginning in such a way that in the event of a collision, damage to the flow component is prevented as independently as possible from the movement trajectory of the flow component between its at least two operating positions.

The present invention solves this task through a motorized vehicle aerodynamics module of the type referred to in the beginning, in which the connecting structure is part of the guiding arrangement, where the evasive movement is different from the displacement under normal operating conditions.

Due to the fact that the connecting structure is part of the guiding arrangement, the aerodynamics module of the present invention can manage with fewer components than the state of the art aerodynamics module described above. This leads not only to less weight, but also to a lower potential for damage in the event of a collision. Consequently, it is also no longer necessary for the guiding arrangement to guide the evasive movement. Therefore, the evasive movement can be different from the displacement between the at least two operating positions under normal operating conditions. Since therefore the movement trajectory of the displacement under normal operating conditions between the at least two operating positions has no effect on the evasive movement which is different from the displacement under normal operating conditions, the essentially identical collision situation can always induce the same evasive movement.

In the present application, "displacement under normal operating conditions" denotes the intended displacement of the flow component between at least two operating positions during intended normal operation. The term "evasive movement" denotes a movement of the flow component in an unusual emergency situation, for instance in the event of a collision. Preferably, the evasive movement is also different from the displacement of the flow component under normal operating conditions in as much as the evasive movement ensues from an operating position of the flow component, but does not end in any position of the flow component that would also be reachable through a displacement of the flow component under normal operating conditions during the intended normal operation.

The at least two operating positions of the flow component comprise a retracted position located nearer to the vehicle's body and an extended position located further away from the vehicle's body. It should not be precluded that the flow component is displaceable into further operating positions also, for instance into intermediate positions between a completely retracted and a completely extended position.

In principle, the evasive movement could also differ from the displacement under normal operating conditions in that they exhibit movement trajectories of different lengths. This should not be precluded in the present case. Independence between the evasive movement and the displacement under normal operating conditions, however, is achieved especially advantageously by the evasive movement of the flow component proceeding along a trajectory that differs from the displacement under normal operating conditions with regard to a direction of movement.

In principle, the evasive movement can be a purely translational evasive motion, although this has certain drawbacks. Specifically, when the force acting on the flow component during a collision should quantitatively as completely as possible be used for the evasive movement of the flow component, the translational evasive motion should preferably take place along a trajectory that is only moderately inclined relative to the roll axis. This further means that the movement path of the flow component until it has moved out of the collision region can be very long. The evasive movement can then last for very long, which may possibly thwart its success in limiting or preventing damage. It is preferable, therefore, for the flow component to perform a pivoting motion as the evasive movement. Since the evasive movement is based on a deformation of the connecting structure and since further an interaction of a guiding formation of the guiding arrangement with the connecting structure can act regionally to increase the stiffness, it is further preferable for the evasive movement to comprise or to be a bending or kinking movement respectively performed about a bending or kinking axis located outside the guiding arrangement.

The connecting structure as part also of the guiding arrangement can exhibit a first section, which interacts directly with a guiding formation of the guiding arrangement for guiding the displacement under normal operating conditions. The connecting structure can moreover exhibit a second section differing from the first section, which is deformable for allowing the evasive movement. In this way it can be made sure that in the event of a collision the guiding formation and thus the guiding arrangement is sufficiently decoupled from the acting collision forces. Indeed, the collision forces that act on the flow component will also have an effect on the guiding arrangement, but normally it will be reduced in quantitative terms, without damaging the guiding arrangement.

Since the flow component, in the event of a displacement under normal operating conditions from the vehicle's body, at which normally the bracket, the power unit, and the parts of the guiding arrangement firmly fixed to the vehicle are arranged, can be moved away and thereby is exposed to a risk of collision, an evasive movement enabled by deformation of the connecting structure can be thereby ensured that the second section is arranged nearer to the flow component than the first section regardless of the operating position of the flow component.

The aforementioned guiding formation of the guiding arrangement can interact with the first section in order to guide the flow component between its intended operating positions.

Deformability of the second section under the action of sufficiently high collision forces can be guaranteed by means of an appropriate shape of the second section of the connecting structure. Here it has proved advantageous for the connecting structure, at least in the second section, to exhibit a rod-like, preferably tubular shape. The rod-like or tubular shape respectively produces not only deformability under the action of sufficiently high collision forces, but also produces sufficient stiffness under the action of forces below a deformation threshold. For it should not be forgotten that significant aerodynamic forces act by design on the flow component, under which as far as possible the flow component should not be displaced.

Preferably, the first section of the connecting structure is also configured with the same shape as the second section. In the case of a rod-like or tubular shape, it can also be precisely guided especially simply as part of the guiding arrangement, for instance along the rod or tube axis. Within the context of the invention, however, it is also conceivable for the first and the second section to exhibit different shapes. This includes the two sections having the same external shape with different structures in the interior of the respective section. For example, one section, for instance the hollow first section, can exhibit at least one stiffness-increasing inner bracing, whereas the hollow second section exhibits insides fewer bracings than the first section or none.

Additionally or alternatively, the second section can be formed from a different material than the first section, in order to decrease the stiffness, in particular bending stiffness, of the second section compared with that of the first section. The first section can then interact as a stiffer section with components of the guiding arrangement, for instance the aforementioned guiding formation. The second section can, as a less stiff section, allow the deformation and thus the evasive movement of the flow component.

The flow component is preferably an air dam or front spoiler, i.e. a flow-controlling component, which deflects an airstream incident on it along a control surface. Normally the flow component is deployed in order to decrease the flow resistance of a vehicle and/or increase its downthrust. The flow component can be wing-shaped or wing-like, for instance with a front subjected to an incident flow and a back situated in the flow shadow. The flow component is significantly longer than it is wide, preferably at least six times, especially preferably at least ten times as long as it is wide. The flow component likewise is preferably considerably wider than it is thick, preferably at least five times, especially preferably at least ten times as wide as it is thick.

As a wing-shaped or wing-like component, the flow component exhibits an inflow lip configured to be subjected to incident flow by the airstream. Preferably, the second section is formed from the same material as the inflow lip, such that the second section can be fabricated in a single injection molding procedure together with the inflow lip. Therefore, preferably the inflow lip and at least the second section of the connecting structure are configured as one piece.

Since the flow component can extend over more than half of the vehicle's width, the connecting structure can exhibit a plurality of connecting part-structures. For example, the connecting structure can exhibit two connecting part-structures, of which each is located nearer to a longitudinal end-region of the flow component than the respectively other longitudinal end-region. In the operationally fitted state, the longitudinal direction of the flow component preferably proceeds in the vehicle's transverse direction.

In principle, the displacement under normal operating conditions of the flow component can be a pivoting movement. However, a translational displacement of the flow component under normal operating conditions requires less space for movement, which therefore is preferred.

In principle, the guiding arrangement can comprise a rolling element guide, such that especially accurate and low-friction guiding of the displacement movement is achieved. What is more cost-effective in comparison is a sliding guide, according to which sliding surfaces of components of the guiding arrangement that are movable relative to each other interact in slide-abutting engagement and which in most cases provides sufficiently accurate displacement guiding.

Regardless of whether the guiding arrangement is a rolling element guide or a sliding guide, the guiding formation can be a guide bushing or guide shell surrounding the first section. By means of the guide bushing that completely surrounds the first section or the guide shell that partly surrounds the first section, a sufficiently stiff guiding section can be formed at which the connecting structure and thus the flow component connected with it can be guided sufficiently accurately for a displacement under normal operating conditions.

The present invention further concerns a vehicle with an aerodynamics module described above. The latter is preferably arranged at the vehicle's body as an air dam and/or front spoiler respectively in front of the front tires, extendible towards the surface supporting the vehicle.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

DESCRIPTION OF PREFERRED EMBODIMENTS

Figure 1:
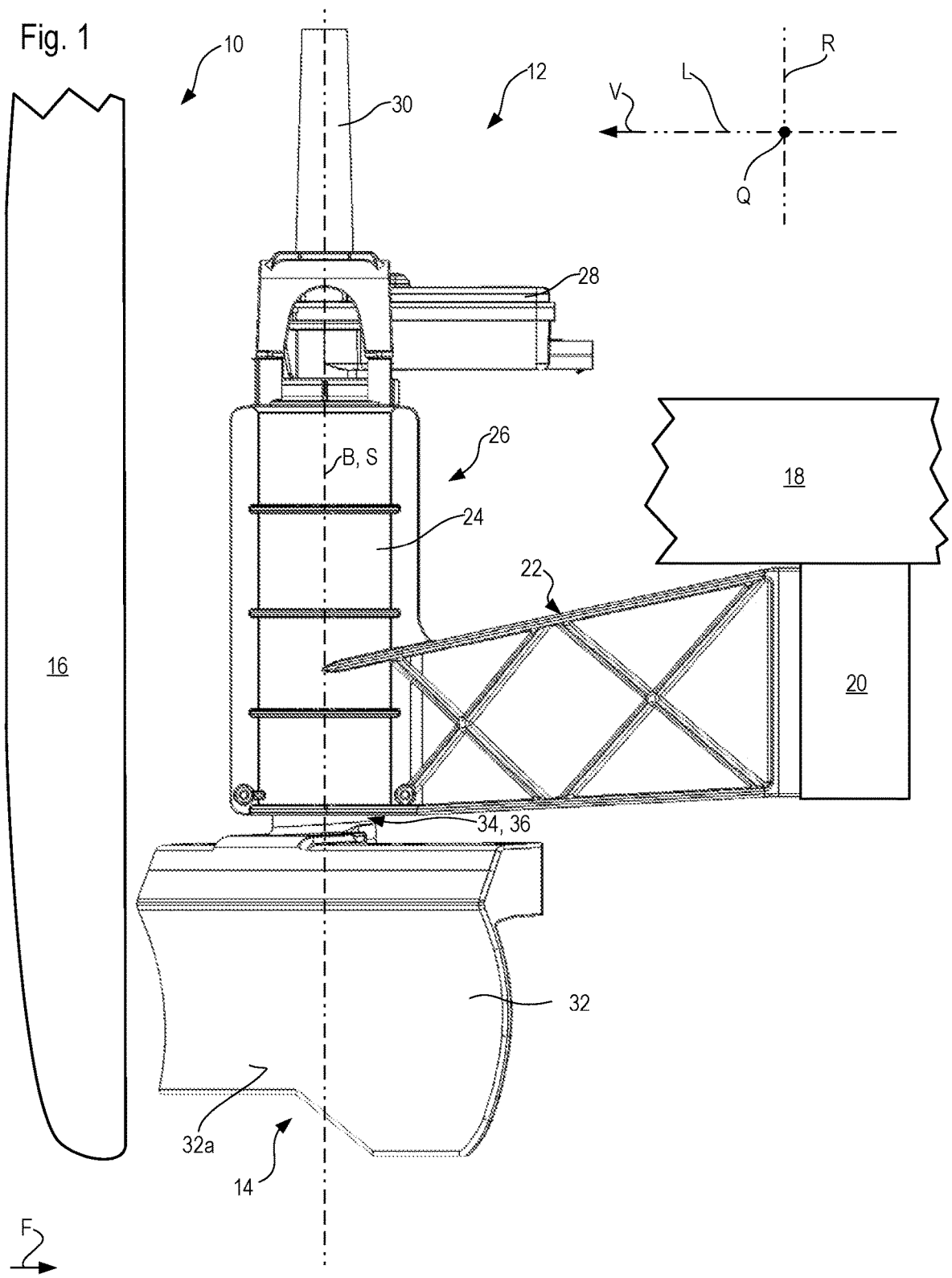
FIG. 1 A rough schematic view of the invention's vehicle aerodynamics module in a first, retracted operating position, FIG. 2 A rough schematic view of the vehicle's aerodynamics module of FIG. 1 in a second, extended operating position, and FIG. 3 A rough schematic view of the vehicle's aerodynamics module of FIG. 2 following an evasive movement as a consequence of a collision of the flow component of the aerodynamics module with an external object.
Figure 2:
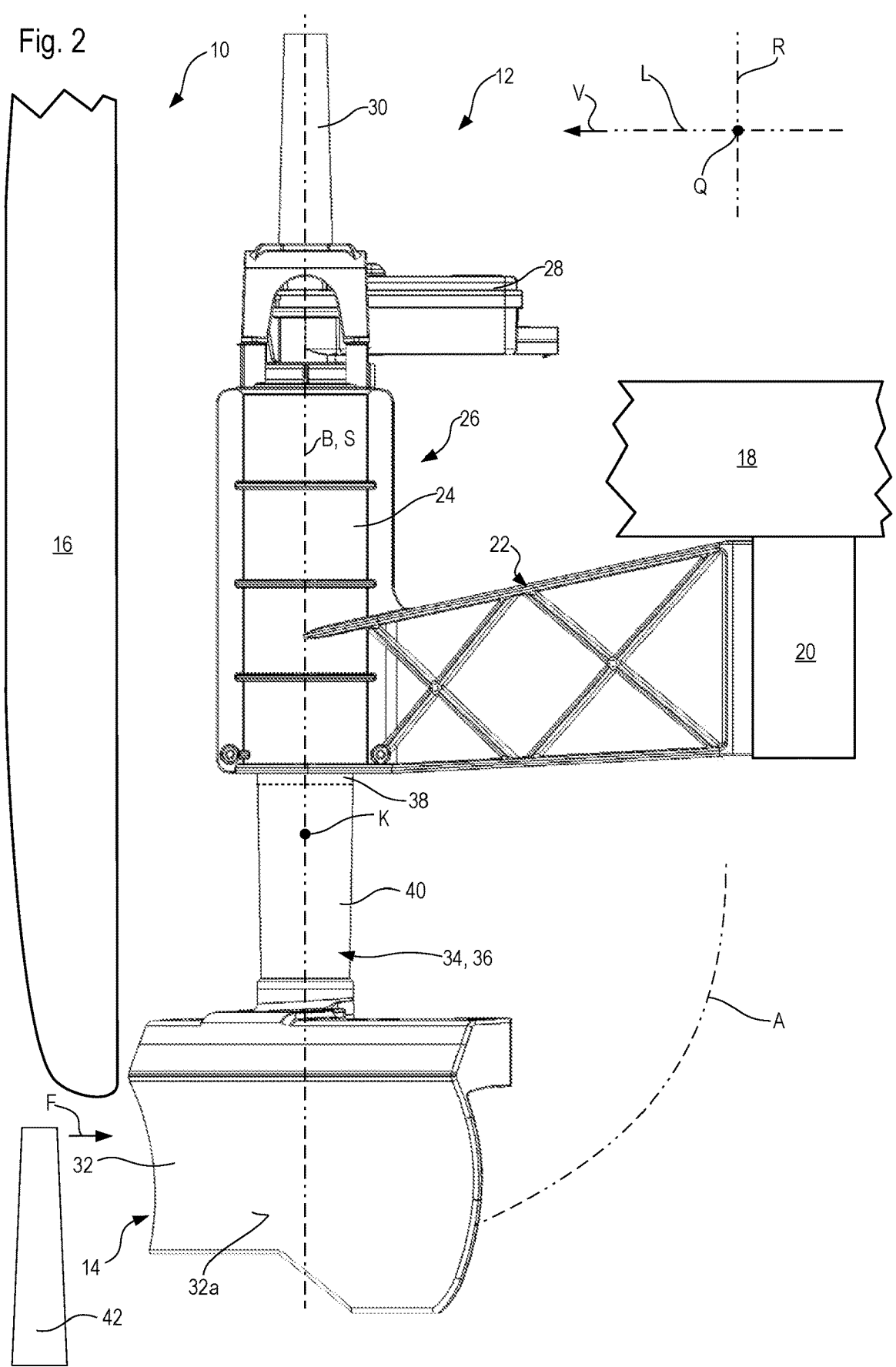

Referring now to the drawings wherein the showings are for the purpose of illustrating preferred and alternative embodiments of the invention only and not for the purpose of limiting the same, in FIGS. 1 to 3, an embodiment of the invention's vehicle aerodynamics module arranged at a vehicle 10 is denoted generally by 12. The observer of FIGS. 1 to 3 looks along the vehicle's transverse axis Q which is orthogonal to the plane of the drawing of FIG. 1, along which the longitudinal axis of the flow component 14 of the vehicle aerodynamics module 12 proceeds.

The vehicle 10 exhibits in rough schematic form a front fairing 16, a carrier 18, and a fixing formation 20 protruding from the carrier 18 and fixed firmly to the vehicle for attaching the aerodynamics module 12.

The vehicle's transverse axis Q corresponds in other nomenclature to the pitch axis of the vehicle 10. Likewise are depicted the vehicle's longitudinal axis L, which corresponds to the roll axis of the vehicle 10, and the vehicle's vertical axis R, which corresponds to the yaw axis of the vehicle 10. The forward travel direction of the vehicle 10 is depicted by the arrow V. Accordingly, during forward travel airstream flows along the direction of the opposite arrow F towards the vehicle 10.

In the depicted example, the flow component 14 is an air dam or front spoiler, which can be lowered towards a road along the movement trajectory B from the retracted operating position of FIG. 1 away from the vehicle's body, for instance away from the front fairing 16, the carrier 18, or the firmly vehicle-attached fixing formation 20. In the depicted example, the flow component 14 is situated in front of the front wheels of the vehicle 10 and screens them partly against the inflowing airstream F. In the first, retracted operating position, the flow component 14 is situated, in the inflow direction, behind the front fairing 16 in its wind shadow and consequently is aerodynamically inactive.

The aerodynamics module 12 comprises a bracket 22, which in the depicted example is connected firmly with the firmly vehicle-attached fixing formation 20. The bracket 22 is configured integrally, for example by means of injection molding, with an outer guide bushing 24 of a guiding arrangement 26 for guiding the displacement under normal operating conditions of the flow component 14 along the movement trajectory B between the retracted operating position of FIG. 1 and the extended operating position of FIG. 2.

At the outer guide bushing 24 there is arranged a power unit 28 which in the present case is a spindle drive, but does not have to be one. The power unit 28 sets a spindle nut, which is not depicted and is not displaceable along the movement trajectory B, in rotation about a spindle axis S which in the depicted embodiment example is collinear with the movement trajectory B. The spindle moved by the spindle nut along the movement trajectory B is not depicted in the drawings. However, there is discernible an elongated frustoconical housing part 30, which screens the movement space of the spindle along the movement trajectory B towards the outside.

The flow component 14 exhibits an inflow lip 32, on which the inflowing airstream F impinges. The inflow lip 32 has an impingement surface or control surface 32a facing towards the airstream F, which is curved concavely with respect to the vehicle's transverse direction Q and which is curved convexly with respect to the vehicle's vertical direction H, when viewed from the inflow direction of the airstream F.

The flow component 14 is connected with a tubular strut 34 which as a connecting structure 36 connects the flow component with the power unit 28 and which with its section located inside the guide bushing 24 is part of the guiding arrangement 26. The section of the tubular strut 34 located inside the guide bushing 24 forms with the guide bushing 24 a sliding guide for guiding the flow component along the movement trajectory B.

FIG. 2 depicts the vehicle 10 again in rough schematic form with the aerodynamics module 12, where the flow component 14 is now situated in the second, extended operating position. The flow component 14 takes up this second operating position as intended when the vehicle 10 travels forward at a predetermined threshold speed or faster. The straight movement trajectory B is also the tube axis of the tubular strut 34.

The tubular strut 34 exhibits a first section 38, which in the second operating position also is still for the most part situated in the guide bushing 24 and/or is surrounded radially on the outside by the guide bushing 24, respectively. To the first section 38 there is connected towards the flow component 14 a second section 40, which exhibits a lower bending stiffness about a bending axis parallel to the vehicle's transverse axis Q than the first section 38. The lower bending stiffness can be effected by forming the second section 40 from a different material than the first section 38. For example, the second section 40 can be made from a thermoplastic elastomer, the first section 38 on the other hand from a non-elastomeric synthetic, such as for example polyamide. In order to increase the strength of the material of the first section 38, it can be filled, for example with glass fibers or glass spheres or generally with particles or fibers. The tubular strut 34 can be fabricated in a two-component injection molding process, where the second section 40 is fabricated preferably integrally and in one injection molding step with the flow component 14 or at least with the inflow lip 32. In FIG. 2, a dotted line just below the guide bushing 24 indicates the boundary between the first section 38 and the second section 40.

Additionally or alternatively to the different choice of material, the second section 40 can be configured with a component cross-section which exhibits lower bending stiffness about a bending axis parallel to the vehicle's transverse axis Q, in particular about a kinking axis K that in the depicted example is located outside the guiding arrangement 26, than a different component cross-section of the first section 38.

If, from the direction of the arrow F a solid body 42, for instance a stone or a road-attached protrusion impinges at sufficiently high speed on the inflow lip 32, the flow component 14 evades the collision along the evasion trajectory A in a bending or kinking movement about the kinking axis K.

FIG. 3 depicts the inflow lip 32 at the end of its collision-induced evasive movement about the kinking axis K. Through the deformation of the second section 40 during the evasive movement, the bending stiffness of the second section 40 is reduced with increasing evasive movement, which facilitates the evasive movement of the inflow lip 32 and of the flow component 14 overall in such a way that starting from a particular deformation of the second section 40, a decreasing force action suffices for a continuation of the evasive movement.

Through the deformation of only the second section 40, the guiding arrangement 26 inclusive of the first section 38 and the power unit 28 remain intact.

Depending on the extent of the deformation, after discontinuation of the collision-induced external force the flow component 14 can reset itself elastically by means of the second section 40 into the second operating position shown in FIG. 2 or a plastic residual deformation can continue to exist at the second section 40. In this case, it would be necessary to replace the flow component 14 with the tubular strut 34. Alternatively, it is conceivable for the second section 40 to be connected detachably by design with the first section 38, such that after a sufficiently severe collision with plastic deformation of the second section 40 it is necessary to replace only the flow component 14 with the second section 40 that is molded integrally with it.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A position-variable motorized vehicle aerodynamics module, comprising:
   A flow component which is configured to be subjected to an incident flow or surrounding flow of an airstream,
   A bracket, which is configured for fixed attachment to a structure fixed to a vehicle,
   A power unit, which is configured to displace the flow component between at least two different operating positions relative to the bracket under normal operating conditions,
   A connecting structure, which connects the flow component with the power unit in a force- and movement-transmitting manner, and
   A guiding arrangement, which guides the displacement movement of the flow component between the at least two operating positions,
   Where the connecting structure is configured, in the event of a force being transmitted to the flow component through collision with a solid body, to allow through deformation an evasive movement of the flow component relative to the bracket, Where the connecting structure is part of the guiding arrangement, where the evasive movement differs from the displacement under normal operating conditions.

2. The vehicle aerodynamics module according to claim 1, wherein the evasive movement proceeds along a trajectory that differs from the displacement under normal operating conditions with regard to a direction of movement.

3. The vehicle aerodynamics module according to claim 2, wherein the evasive movement comprises or is a bending or kinking movement performed about a bending or kinking axis respectively located outside the guiding arrangement.

4. The vehicle aerodynamics module according to claim 1, wherein the evasive movement comprises or is a bending or kinking movement performed about a bending or kinking axis respectively located outside the guiding arrangement.

5. The vehicle aerodynamics module according to claim 1, wherein the connecting structure exhibits a first section which interacts directly with a guiding formation of the guiding arrangement for guiding the displacement under normal operating conditions and that the connecting structure exhibits a second section differing from the first section, which is deformable for allowing the evasive movement.

6. The vehicle aerodynamics module according to claim 5, wherein the second section is arranged nearer by the flow component than the first section regardless of the operating position of the flow component.

7. The vehicle aerodynamics module according to claim 6, wherein the connecting structure exhibits at least in the second section a rod-like shape.

8. The vehicle aerodynamics module according to claim 7, wherein the rod-like shape is a tubular shape.

9. The vehicle aerodynamics module according to claim 5, wherein the connecting structure exhibits at least in the second section a rod-like shape.

10. The vehicle aerodynamics module according to one of the claim 7, wherein the second section is formed of a different material than the first section.

11. The vehicle aerodynamics module according to one of the claim 5, wherein the second section is formed of a different material than the first section.

12. The vehicle aerodynamics module according to claim 11, wherein the flow component exhibits an inflow lip configured to be subjected to incident flow by the airstream, where the second section is formed from the same material as the inflow lip.

13. The vehicle aerodynamics module according to claim 10, wherein the flow component exhibits an inflow lip configured to be subjected to incident flow by the airstream, where the second section is formed from the same material as the inflow lip.

14. The vehicle aerodynamics module according to claim 1, wherein the displacement under normal operating conditions is a translational motion of the flow component.

15. The vehicle aerodynamics module according to claim 14, wherein the guiding arrangement comprises a sliding guide.

16. The vehicle aerodynamics module according to claim 5, wherein the guiding formation is a guide bushing or guide shell surrounding the first section.

17. The vehicle aerodynamics module according to claim 1, wherein the flow component is an air dam.

18. A motorized vehicle with a vehicle aerodynamics module according to claim 1.

* * * * *

UNITED STATES PATENT AND TRADEMARK OFFICE
CERTIFICATE OF CORRECTION

| | |
|---|---|
| PATENT NO. | : 11,851,112 B2 |
| APPLICATION NO. | : 17/508136 |
| DATED | : December 26, 2023 |
| INVENTOR(S) | : Karsten Grebel et al. |

It is certified that error appears in the above-identified patent and that said Letters Patent is hereby corrected as shown below:

In the Claims

Column 8, Lines 55 to 56, Claim 10, remove the text "one of the".

Column 8, Lines 58 to 59, Claim 11, remove the text "one of the".

Signed and Sealed this
Twentieth Day of February, 2024

*Katherine Kelly Vidal*

Katherine Kelly Vidal
*Director of the United States Patent and Trademark Office*